United States Patent [19]

Seymour

[11] 4,357,156
[45] * Nov. 2, 1982

[54] MINIMIZING SURFACE DISTORTION WHILE SHAPING GLASS SHEETS

[75] Inventor: Samuel L. Seymour, Oakmont, Pa.

[73] Assignee: PPG Industries, Inc., Pittsburgh, Pa.

[*] Notice: The portion of the term of this patent subsequent to Nov. 11, 1997, has been disclaimed.

[21] Appl. No.: 170,357

[22] Filed: Jul. 21, 1980

Related U.S. Application Data

[63] Continuation-in-part of Ser. No. 44,425, Jun. 1, 1979, Pat. No. 4,233,049, which is a continuation-in-part of Ser. No. 960,404, Nov. 13, 1978, abandoned.

[51] Int. Cl.$^3$ .............................................. C03B 23/025
[52] U.S. Cl. ........................................ 65/104; 65/106; 65/107; 65/268; 65/273
[58] Field of Search .................. 65/104, 106, 107, 114, 65/268, 273

[56] References Cited

U.S. PATENT DOCUMENTS

| | | | |
|---|---|---|---|
| 3,223,501 | 12/1965 | Fredley et al. | 65/25 |
| 3,223,504 | 12/1965 | Cypher et al. | 65/106 |
| 3,396,000 | 8/1968 | Carson et al. | 65/104 |
| 3,476,540 | 11/1969 | Ritter et al. | 65/107 |
| 3,507,639 | 4/1970 | Seymour | 65/104 |
| 3,573,889 | 4/1971 | McMaster et al. | 65/62 |
| 3,600,150 | 8/1971 | Rougeux | 65/268 |
| 3,676,098 | 7/1972 | Hall | 65/106 |
| 3,713,799 | 1/1973 | McMaster et al. | 65/273 |
| 3,846,104 | 11/1974 | Seymour | 65/104 |
| 4,092,141 | 5/1978 | Frank et al. | 65/114 |
| 4,202,681 | 5/1980 | McMaster et al. | 65/104 |
| 4,204,854 | 5/1980 | McMaster et al. | 65/106 |
| 4,233,049 | 11/1980 | Seymour | 65/106 |
| 4,282,026 | 8/1981 | McMaster et al. | 65/104 |

FOREIGN PATENT DOCUMENTS

3391  1/1979  European Pat. Off. .

Primary Examiner—Arthur D. Kellogg
Attorney, Agent, or Firm—Donald Carl Lepiane; Edward I. Mates

[57] ABSTRACT

This invention relates to heat treating glass sheets, and particularly relates to shaping and tempering a glass sheet comprising a step of supporting the sheet while heat softened with its upper surface against a glass sheet holder. In order to minimize surface distortion resulting from the heat-softened glass sheet replicating any surface deficiencies in the holder such as surface blemishes if the sheet is forced against a continuous surface by an upward flow of gas pressure, or those resulting from perforations through the bottom wall of the holder if the holder is of the vacuum type that holds the glass sheet thereagainst by suction, the present invention interposes a soft, fluffy, porous cover of fiber glass fabric, perferably knit fabric composed of texturized yarns between the upper surface of the glass sheet and the glass sheet holder. Other optional features of this invention comprise the use of more precise temperature control in the form of electrical resistance heaters to irradiate the upper surface of the glass sheet while a gas hearth is used to both heat and float the glass sheet, heating the upper glass sheet surface to a maximum temperature of about 10° F. to 50° F. less than the maximum temperature of the lower surface of the sheet so that the upper glass sheet surface that engages the soft, fluffy, porous cover is relatively hard compared to its surface hardness were the glass sheet heated to a uniform temperature throughout its thickness when the sheet is heated to an overall temperature suitable for tempering.

10 Claims, 8 Drawing Figures

MINIMIZING SURFACE DISTORTION WHILE SHAPING GLASS SHEETS

CROSS-REFERENCE TO RELATED APPLICATIONS

This application is a continuation-in-part of U.S. Application Ser. No. 44,425, filed June 1, 1979 now U.S. Pat. No. 4,233,049, which, in turn, is a continuation-in-part of U.S. Application Ser. No. 960,404, filed on Nov. 13, 1978 abandoned.

BACKGROUND OF THE INVENTION

1. Field of the Invention

This invention relates to the bending of sheets of thermoplastic material, especially glass. Many techniques for bending glass sheets are known. Perhaps the simplest technique is to heat a glass sheet while supported on a contoured mold and to permit the glass sheet to sag into conformity with the mold. However, it is often desirable to speed the process by applying a mechanical bending force such as by pressing the glass between a pair of contoured molds. Another desirable process for shaping glass sheets is the recently invented process of drop forming, to be discussed later.

2. Description of Patents of Interest

U.S. Pat. No. 3,223,501 to J. C. Fredley et al discloses a gas hearth bed that uses hot gas for supporting and heating glass sheets to their deformation or tempering temperature while the sheets are conveyed along a furnace. Bottom surface heating by convection of hot gas and radiation of heat from the hot gas bed is supplemented by radiant heaters that irradiate the upper surface in an attempt to equalize top and bottom surface heat as a means to avoid thermal warpage. Electrical heaters may be used as a source of radiant heat in this patent. While temperature control is a factor in this patent to develop an adequate temper in the glass sheets treated, no harm results to the optical properties of the glass sheet surface treated by this patented apparatus if the maximum glass sheet temperature should exceed the minimum temperature needed for tempering, because the major surfaces of the glass sheet are maintained out of contact with solid members in this patent.

U.S. Pat. No. 3,396,000 to F. J. Carson et al discloses a method of bending and tempering glass sheets in which the sheets are shaped by warping due to a differential application of coolant to the opposite major sheet surfaces of a glass sheet immediately after the sheet is heated to substantially the softening point of the glass.

A particularly advantageous press bending process is shown in U.S. Pat. No. 3,846,104 to S. L. Seymour wherein a horizontally oriented glass sheet is heated and lifted by a lower bending mold into contact with an upper bending mold where it is retained by vacuum while the lower bending mold retracts. Then a tempering ring receives the bent glass sheet and conveys it from the bending station into a tempering station. That arrangement is especially advantageous in that it provides contoured support for the bent glass sheet during the tempering step and frees the bending station for initiating the next bending cycle while tempering of the first glass sheet is being carried out. A drawback to such an arrangement is that the major components of the apparatus, the upper and lower forming molds and the tempering ring, must all be custom fabricated for each different shape produced on such a bending and tempering line. It would be desirable not only to reduce the cost of fabricating these elements with each shape change, but also to reduce the down time of the bending and tempering line necessitated by the installation of these elements with each product change.

In U.S. Pat. No. 3,713,799 to H. A. McMaster, a similar arrangement is disclosed, but in which the lower shaping mold serves to carry the bent glass sheet into the tempering station, thus delaying the commencement of the next bending cycle until the lower shaping mold deposits the glass sheet in the tempering station and returns to the bending station. Likewise, in this arrangement a product change requires a major retooling of the bending station since the upper and lower forming molds as well as the gas support block into which the lower forming mold recesses, all must conform to the shape of the glass sheets being processed. A similar arrangement in U.S. Pat. No. 3,573,899 to H. A. McMaster et al. has the same drawback.

U.S. Pat. Nos. 3,507,639 to S. L. Seymour and 3,676,098 to H. R. Hall both show horizontal press bending arrangements wherein only two elements, the upper and lower bending molds, need to be custom fabricated for each glass shape being produced. It would be desirable to reduce the number of custom made parts even further. Furthermore, in both of these arrangements the edges of the bent glass sheets are not supported as they are conveyed from the bending station into the tempering station.

U.S. Pat. No. 3,476,540 to Ritter et al. discloses a glass bending arrangement whereby the inertia of a single vertically rising lower bending mold effects the bending. Disadvantageously, the bent glass sheets produced by this patented apparatus must pass without edge support along a roller conveyor into the tempering zone.

U.S. Pat. No. 3,600,150 to Rougeux shows a glass bending arrangement wherein a heat-softened glass sheet is slipped from a roller conveyor onto a flexible hammock and thereafter press bent between upper and lower forming molds. The purpose of the flexible hammock is to support the glass sheet initially out of contact with the rigid shaping mold surfaces. It is apparent that a major reconstruction of the apparatus would be required when a change in the glass shape is desired.

U.S. Pat. No. 4,092,141 to Frank et al discloses glass sheet shaping apparatus comprising a vacuum mold having a downwardly facing, apertured wall of metal covered with a refractory material such as fiber glass. The fiber glass cover is interposed between the convexly curved, downwardly facing, apertured wall of the vacuum mold and the upper surface of the shaped glass sheet, which is concavely curved in elevation. The surface of a glass sheet that is curved concavely develops a surface stress that increases the resistance of the glass sheet to develop surface distortion.

U.S. Pat. No. 4,202,681 to McMaster et al covers a vacuum holder system and a method for its use in bending glass. It discloses a three step method of using the system by first applying a high vacuum to engage a glass sheet against an apertured bottom plate of a vacuum holder, then applying a reduced vacuum to reduce the likelihood that the hot glass sheet would deform against the openings in the bottom plate of the vacuum holder and finally, applying a positive pressure to help separate the glass sheet from the vacuum holder. There is no teaching in the patent of covering the apertured bottom plate with a plurality of layers of porous fiberglass cloth to protect the major surface of the glass sheet from deforming into the apertures of the bottom plate when held thereagainst by suction.

U.S. Pat. No. 4,204,854 to McMaster et al teaches applying upwardly blown gas from beneath the spaces between rollers of a roller conveyor to lift a glass sheet into engagement against the downwardly facing, apertured surface of a vacuum holder. In this patent, the glass sheet is transferred from the vacuum holder to a ring mold having a shape that corresponds to the periphery of the sheet of bent glass. The holder may include a flat ring (see FIG. 8) or a curved ring 48 (see FIG. 9). This patent uses the upward gas flow to lift the glass sheet off the roller conveyor and onto the vacuum holder. Vacuum may be applied supplementary to the upward lift provided by the upward gas flow. This patent also finds it necessary to control the supplemental suction to avoid developing upward deformations in the hot glass sheet in those regions that engage the perforations of the vacuum plate by suction. This patent also fails to teach covering the apertured plate with a plurality of layers of porous fiberglass cloth.

Whenever it becomes necessary to develop a vacuum cycle comprising a high vacuum step followed by a lesser vacuum step, a complication is introduced into the control system for the vacuum cycle. The change in vacuum must be timed precisely with the engagement of the hot glass sheet by the apertured plate of the vacuum holder. Since glass sheets arriving for treatment at the shaping station are not of uniform thickness from sheet to sheet, lighter, thinner sheets are engaged more rapidly than heavier, thicker glass sheets. Hence, an automatic timing system to control a vacuum cycle would engage thinner glass sheets more susceptible to surface distortion than thicker glass sheets for a longer period at a higher vacuum than is necessary to engage the thinner glass sheets. Therefore, the latter are more likely to develop surface distortion. Furthermore, if the timing cycle is adjusted to reduce the duration of the high vacuum to conform to the requirements of thinner glass sheets, such a modified cycle might cause the vacuum to be reduced before a thicker glass sheet is engaged sufficiently for the reduced vacuum to suffice to maintain the thicker hot glass sheet in engagement against the downwardly facing, apertured, lower plate of the vacuum holder. Consequently, under such circumstances, a heavier glass sheet may drop by gravity before a ring-like member arrives in a proper position beneath the vacuum-engaged glass sheet. Such premature dropping is likely to interrupt operations until the glass is removed and the shaping station cleared for further operations.

It would be beneficial for the glass sheet shaping art to develop method and apparatus that improves the optical properties of the shaped glass sheets and also reduces the duration and frequency of breakdowns in operations that result from improper timing of the steps in the vacuum applying portion of a glass sheet shaping cycle. This benefit increases in importance in the handling of thin glass sheets ($\frac{1}{8}$ inch or 3.2 mm thick or less) that are more readily distorted and whose ratio of weight variances to total weight is more than for thicker glass sheets.

SUMMARY OF THE INVENTION

In apparatus for performing the present invention, a single shaping mold conforming to the outline and contour of the bent glass sheet is employed, onto which a heat-softened glass sheet, whose temperature is precisely controlled, particularly at its upper surface, is dropped to impart the bending force to the glass. Immediately after each glass sheet leaves a heating furnace, it is elevated toward a smoothly surfaced, flat glass sheet holder, either by positive upward pressure or by suction from a vacuum platen having a perforated lower wall covered by a soft, fluffy, porous cover of fiberglass fabric, which contacts the upper side of the glass sheet. When the holder or vacuum platen and the glass sheet are raised to an elevated position, the porous cover is maintained between the glass sheet and the holder or platen to protect the sheet from distortion by imperfections in the lower wall, the shaping mold is conveyed into a position beneath the glass sheet, the upward pressure or vacuum is ended, and the glass sheet drops onto the shaping mold to effect the bending. The shaping mold is then retracted from beneath the holder or platen and passed into a tempering station where blasts of cold tempering medium, such as air, are directed onto the opposite surfaces of the glass sheet to temper the glass.

In order to minimize surface distortion due to engagement of the hot glass sheet by an apertured lower plate of a vacuum holder, the porous fiber glass cover is composed of at least two layers of soft, fluffy, porous fiber glass. A knit fiber glass fabric composed of textured yarn such as those used to shape glass sheets by press bending as covered in U.S. Pat. No. 3,148,968 of James H. Cypher and Clement E. Valchar, the description of which is incorporated herein, is an especially good porous fiber glass cover for a vacuum platen or a glass sheet holder that temporarily engages a hot, flat glass sheet during a glass sheet shaping operation.

In shaping glass sheets, it is imperative to heat the glass to its deformation temperature. When glass sheets are shaped and tempered, the maximum temperature of the heating and cooling cycle incidental to shaping and tempering is above the deformation temperature of the glass. It is necessary in treating thinner glass sheets to raise their temperature sufficiently high to compensate for heat losses during the shaping step and prior to the rapid cooling step that establishes the degree of temper that develops in the glass. Too high a maximum temperature during the heat treatment cycle increases the chances of deforming the glass sheet portion that engages the apertured plate of the vacuum support. Optionally, the present invention may also include glass sheet heating means that controls the heat input to the glass sheet with the best precision possible. According to this optional feature that may be used in conjunction with the present invention, such precise temperature control is provided by a combination of a hot gas support bed that applies both heat and a supporting fluid bed for the glass sheets that move through the furnace with an array of downwardly facing radiant heaters of the electrical resistance type, which can be controlled for intensity of radiation more precisely than other types of radiant heaters. Since the bottom surfaces of glass sheets treated by apparatus modified by the present invention make little or no contact with solid members en route to the bending station and the upper surface is engaged by a solid member throughout its extent while the bottom surface is exposed to fluid in the bending station while the glass sheet is at or near its maximum temperature, controlling the upper surface temperature precisely is more critical than temperature control for the bottom surface. The use of overhead electrical heaters in the furnace provides the precision of control of temperature needed for the upper glass sheet surface. Preferably, the upper glass surface temperature is 10° F. (6° C.) to 50° F. (28° C.) cooler than the bottom glass surface temperature when the glass sheet engages the vacuum holder at the bending station while the overall glass temperature is in the glass deformation range.

Another optional feature of this invention is the arrangement of the apertures in the downwardly facing, apertured plate of the vacuum holder. Preferably, a larger number of smaller diameter apertures relatively closely spaced together is preferred over fewer apertures of larger diameter spaced more widely apart. Specific embodiments of this invention to be described later will recite preferred dimensions for the apertures, their spacing from one another and their arrangement throughout the extent of the apertured plate.

Another optional feature of the present invention relates to the amount of suction applied to engage a hot glass sheet against the porous fiber glass cover for the vacuum holder. The amount of suction applied should be more than is necessary to hold the hot glass sheet against the vacuum holder, but not so much more than the minimum needed to avoid dropping the sheet that will develop a replica of the design of the fiber glass fabric in the engaging surface of the hot glass sheet. A preferred range of suction force compared with that needed to hold the sheet against the vacuum holder to insure against dropping the sheet inadvertently or replicating the design of the fiber glass fabric is disclosed and claimed hereinafter.

The benefits of the present invention to produce fainter imperfections than the prior art will be understood further after studying a description of a preferred embodiment and modifications thereof that follows. The description includes various illustrations. In the drawings that form part of the description of the preferred embodiment, like reference numbers are applied to like structural elements.

THE DRAWINGS

DETAILED DESCRIPTION

Figure 1:
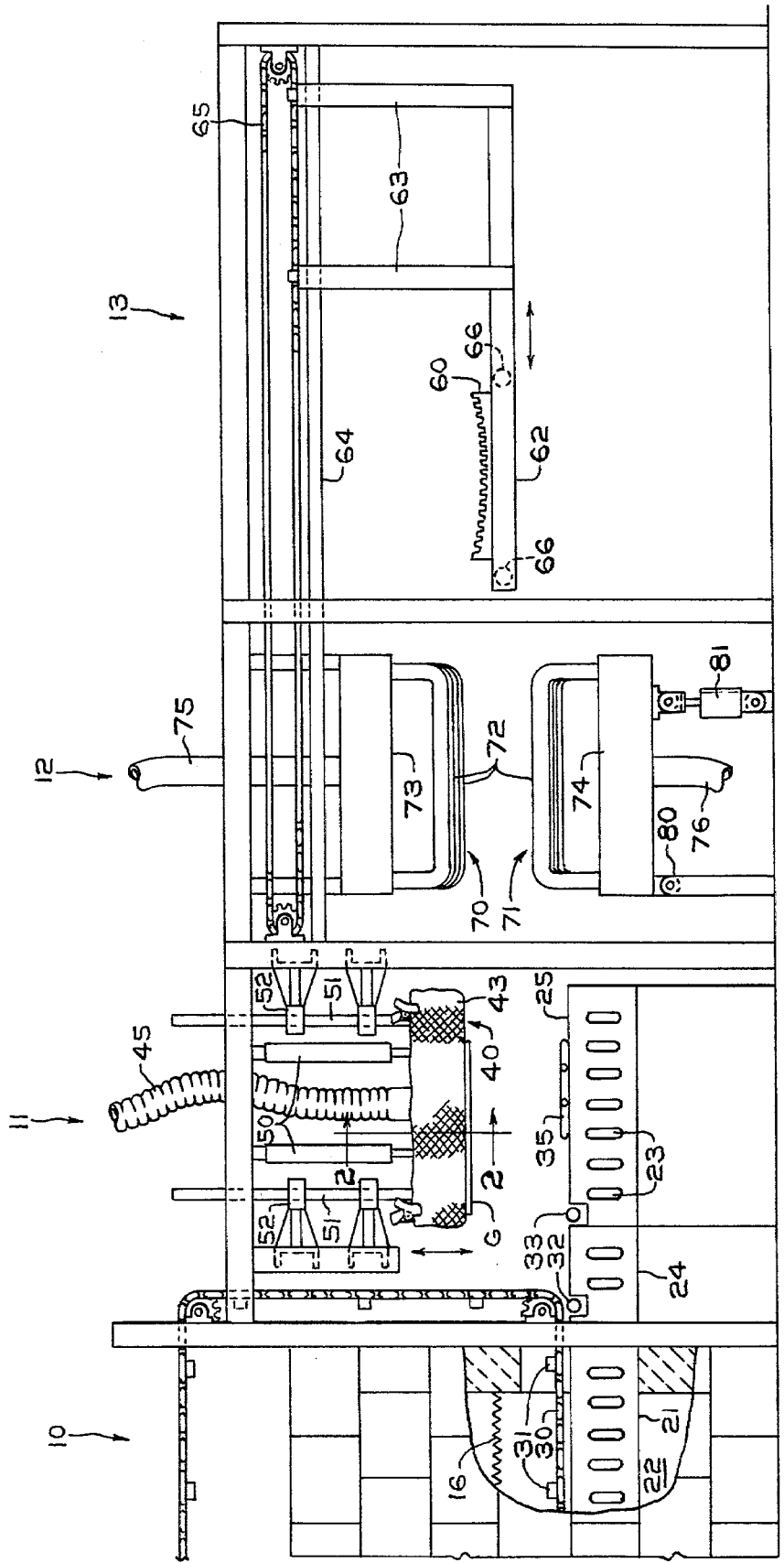
FIG. 1 is a side view of a specific preferred embodiment of a glass sheet bending and tempering apparatus incorporating the drop forming process and flat vacuum pick-up of the present invention.
Figure 2:
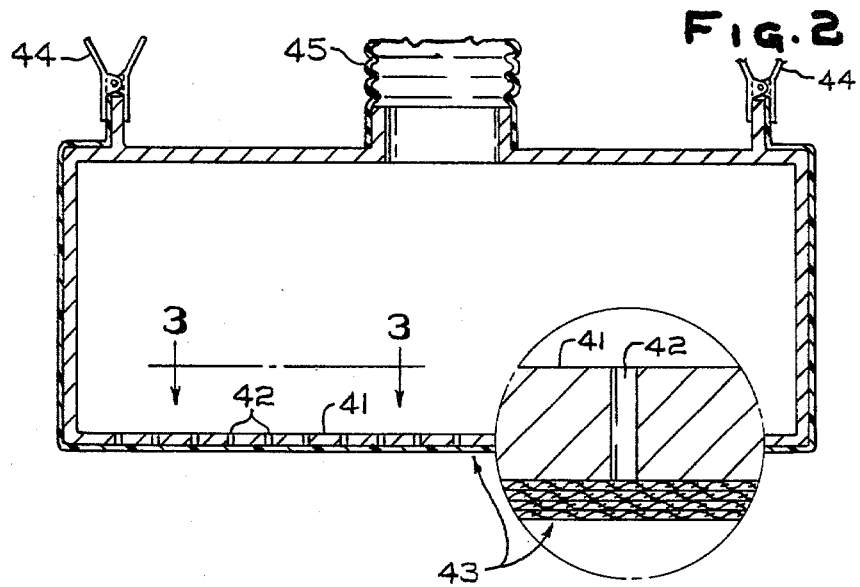
FIG. 2 is a cross-sectional view of a vacuum holder included in the bending and tempering apparatus, taken along the line 2—2 of FIG. 1.
Figure 3:
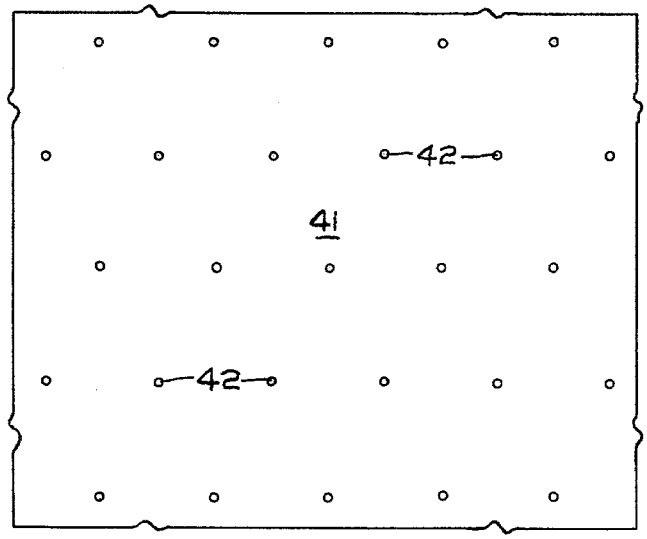
FIG. 3 is a fragmentary plan view of a portion of an apertured bottom wall of the vacuum holder, taken along line 3—3 in FIG. 2, and FIGS. 4 through 8 illustrate sequential steps in a cycle of operation of the apparatus of FIG. 1.

In FIG. 1 there is shown a bending and tempering line including a furnace 10 (only the exit end of which is shown), a bending station 11, a tempering station 12, and an unloading station 13. The furnace, tempering station, and unloading station form no part of the present invention, and the description of a specific embodiment herein is for the purpose of illustration only. Any arrangement known in the art for heating and tempering a series of horizontally disposed glass sheets may be employed in connection with the bending process of the present invention. Accordingly, only a brief description of the furnace, tempering station and unloading station will be set forth here. Additional details regarding these aspects of the overall bending and tempering line may be obtained from U.S. Pat. No. 3,846,104 (Seymour), the disclosure of which is incorporated herein by reference.

Furnace 10 is preferably of the gas support type wherein the sheets of glass are supported on a layer of hot gases as they are heated and conveyed through the furnace. Examples of gas support furnaces for heating glass sheets may be found in U.S. Pat. No. 3,223,501 to Fredley et al. and in U.S. Pat. No. 3,332,759 to McMaster et al. In the cut-away portion of the furnace in FIG. 1, it can be seen that electrical resistant radiant heaters 16 are supported from the furnace roof to irradiate downwardly. In addition, the gas support bed is defined by a hearth block 21 through which a large number of vertical bores extend, some of which communicate the upper surface of the hearth block with hot, pressurized gases from a plenum chamber 22 and others of which communicate the top surface of the hearth block with cross-bored exhaust passages 23. The same hearth block construction continues beyond the furnace exit to an extension 24 and a support block 25 in the bending zone.

Referring again now to FIG. 1, there is shown one typical arrangement for propelling the glass sheets through the furnace as they are supported on a film of hot gases. The conveying mechanism there comprises a pair of parallel, endless chains 30 flanking the path of the glass sheets inside the furnace and joined by a plurality of pusher bars 31. At the exit of the furnace, each glass may be released from the chain conveying means and driven at an accelerated speed across the extension block 24 and into the bending station by means of an upstream roll 32 and a downstream roll 33. Passage of the glass sheets from the furnace may be aided by providing the hearth blocks 21, 24, and 25 with a slight downward slope (e.g., 1 degree to 2 degrees). Typically, sufficient gas pressure is maintained between the hearth blocks and the glass sheets so as to float the glass sheets about 1/16 inch (1.6 millimeters) above the upper surface of the hearth blocks. Upstream roll 32 and downstream roll 33 project above the upper surface of the hearth blocks just enough to make contact with the undersides of the glass sheets.

The upstream roll 32 is located approximately at the exit of the furnace 10. The downstream roll 33 is longitudinally spaced downstream of the upstream roll 32 by a distance that preferably is considerably less than the dimension of a glass sheet along its path of travel while being treated by the bending apparatus. In the event longer sheets are being treated, it may be necessary to interpose additional rolls (not shown) intermediate the upstream roll 32 and the downstream roll 33.

All of the rolls are mounted for rotation about axes extending normal to said path of travel provided for the glass sheets over the hearth blocks 21, 24 and 25. The upper common tangent of the upstream roll 32 and downstream roll 33 is at an elevation to contact the lower surface of the glass sheet or sheets that enter the bending station. The number of rolls beginning with the upstream roll 32 and ending with the downstream roll 33 should be the minimum required to deliver the glass sheet so that its forward end is received in approximate alignment with aligning means comprising a locator frame 35 (to be described). The longitudinal distance between adjacent of said rolls must be such that two adjacent rotating rolls rotating about parallel axes extending normal to the path of glass sheet travel over the gas support bed provided by the hearth blocks 21, 24 and 25 enables the handling of sheets of nonrectangular outline with minimum misorientation or misalignment when the rotating rolls simultaneously engage the undersurface of the glass sheet across its entire width to help deliver the glass to a proper position and orientation at the bending station.

However, should too many rolls be used in delivering the glass sheet into engagement with said aligning means, the rolls interfere with the free upward flow of hot gas against the under surface of the glass sheet. Such relatively unimpeded, hot flow maintains the glass sheet at an elevated temperature sufficient to insure an adequate tempering when the heated glass sheet is chilled at a rapid rate while supported on the bending mold of outline configuration conforming to the shape and outline desired for the glass sheet.

Figure 5:
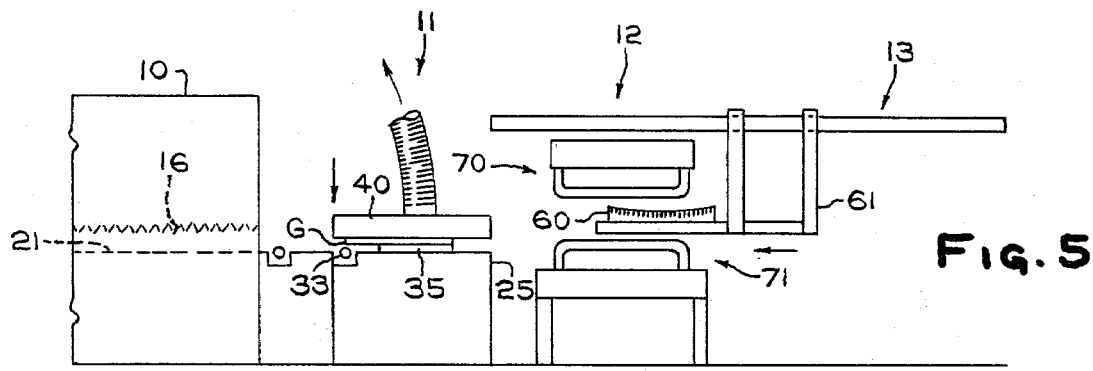

When a glass sheet has arrived in the bending station, its forward progress is stopped by glass sheet aligning means comprising a locator frame 35 resting on hearth block 25. The locator frame defines at least one open-minded "pocket" within which the forward portion of a glass sheet may be received. The glass sheet receiving pocket is contoured to correspond approximately to the outline of the leading portion of the glass sheet so that the glass sheet, when urged into engagement with the locator frame, will become seated firmly and nest within the pocket with little or no freedom of movement. The locator frame 35 is spaced from the downstream roll 33 a precisely determined distance so that the trailing edge of a properly aligned glass sheet is approximately directly over the center of the downstream roll 33 as shown in FIG. 5. The downstream roll 33 continues rotating so as to urge the glass sheet into the pocket of the locator frame as the glass sheet floats on the layer of hot gases. The frictional force between the downstream roll 33 and the glass sheet is minimized and restricted to the trailing edge of the glass sheet in order to avoid scuffing the glass, but is sufficient to drive the floating glass sheet into an equilibrium position in alignment with the pocket of the locator frame and to retain the glass sheet therein. Such an aligning arrangement readily lends itself to processing a plurality of glass sheets side by side.

Directly overlying the locator frame 35 is a glass sheet holder in the form of a vacuum platen 40. The vacuum platen is comprised of a hollow chamber having a flat bottom plate 41 through which a large number of perforations 42 extend. In order to protect the surface of the hot glass sheets, the underside of the vacuum platen is covered with a protective cover 43 of a porous material that is soft and fluffy, and which may be a stretchable knit fiber glass fabric as disclosed in U.S. Pat. No. 3,148,968 to J. H. Cypher et al. The cover 43 may be held in place by a plurality of clamps 44. The hollow interior of the vacuum platen communicates with a source of vacuum by means of a flexible conduit 45. The area of the vacuum platen should exceed the total area of the largest glass sheet or sheets to be received at one time in the locator frame 35. For the greatest versatility, the vacuum platen may cover substantially the entire area of hearth block 25.

The flatness and rigidity of the bottom plate 41 of the vacuum platen are important factors for the successful practice of the present invention. Any significant deviation from flatness can result in distortion being imparted to the glass sheets. Thus, the bottom plate 41 should be fabricated with careful attention to providing a flat bottom surface and should be sufficiently rigid to avoid any bending or warping during use. Preferably, the bottom plate is a relatively thick, single piece of heat-resistant metal, such as stainless steel, although in some cases it may be possible to use thinner stock material with reinforcement members welded to the interior surface. As an example of the preferred one-piece construction, a stainless steel thickness of at least one-half inch (13 millimeters), preferably at least ⅝ inch (16 millimeters), has been found suitable for a plate 32 inches by 78 inches (81 centimeters by 2 meters). In that example, the interior of the vacuum platen was 3 inches (7.5 centimeters) tall.

The vacuum platen is provided with means for vertical reciprocation, such as hydraulic cylinders 50 and guide rods 51, as shown in FIG. 1. The guide rods 51 may slide in fixed, annular sleeves 52. The cylinders 50 reciprocate the vacuum platen between a raised position, as shown in FIG. 1, and a lowered position in which the platen is brought closely adjacent to, or in contact with, the locator frame 35 and the glass sheet or sheets held by the locator frame. When the vacuum platen is in the lowered position, sufficient vacuum is applied to draw the glass sheet into contact with the platen and to be lifted by the vacuum platen as the vacuum platen is raised. The platen need not come into contact with the glass sheets in order to pick them up. Merely approaching within 1/32 inch (0.8 millimeter) to about 1/16 inch (1.6 millimeters) has been found sufficient to lift the glass sheets, although this may vary depending upon the amount of vacuum applied and the weight of the glass.

Additionally, the amount of vacuum required, the number of perforations 42 in the vacuum platen, and the diameter of the perforations are interdependent. It is desirable to keep the perforations 42 small in number and diameter so as to minimize the power requirement for maintaining a vacuum in the vacuum platen, but there should be enough perforations so that a relatively uniform distribution of the perforations will overlie each portion of the smallest piece of glass to be processed. A spacing of about one perforation per square inch (6.5 square centimeters) has been found to be suitable for most purposes. Perforation diameters larger than 0.075 inch (1.9 millimeters), for example about 0.090 inch (2.3 millimeters), have been found satisfactory with a vacuum of 4 inches (10 centimeters) water (gauge). These data pertain to the processing of 3 millimeter thick sheets of soda-lime-silica float glass of standard commercial composition.

At least two layers of porous fiber glass cloth are included in the cover 43. The cover is free of any perforations extending through the thickness thereof. The porosity of the cover results from the inherent porosity of the fiber glass fabric.

Such porosity makes it possible to use larger perforations 42 in the flat bottom plate 41 of the vacuum platen 40, which facilitates sucking the glass sheet against the vacuum platen. At the same time, the interposition of the porous, fiber glass cloth cover avoids dimpling the heat-softened glass sheet in its regions that would engage the perforations in the absence of the porous cover. The layers of the porous fiber glass cover 43 separate the glass sheet from direct contact against the apertured metal plate 41 and also provide innumerable, narrow, tortuous passages through which vacuum drawn through the perforations 42 draw the glass sheet toward the vacuum platen 40. The cross sections of these individual passages are so small and the cushiony effect of the fiber glass layers is such that there is virtually no dimpling effect on the glass sheet in comparison to what happens when the glass sheet engages the apertured plate 41 directly or even in comparison to what happens when the glass sheet engages a fiber glass cover 42 having perforations therethrough that conicide with the perforations 42 in the apertured bottom plate 41 of the vacuum platen 40.

Typical satisfactory arrangements of perforations 42 are rectangular or diamond shaped arrays, preferably with the perforations arranged in parallel rows of perforations, with the adjacent rows spaced from one another in a direction transverse to the length of the rows by a distance approximately the distance between adjacent perforations in a given row.

For round perforations, the following arrangements of perforations and spaces between perforations have been found to be suitable. These arrangements are reported in Table I.

TABLE I

| Diameter of Perforations | Distance between Perforations in Rows and from Row to Row |
| --- | --- |
| 5/64 inch (78 mils-1.98mm) | ¾ inch (19.05mm) |
| 3/32 inch (94 mils-2.38mm) | 1 inch (25.4mm) |
| .11 inch (110 mils-2.79mm) | 1.5 inch (38.1mm) |

Table II indicates the amount of suction needed to hold glass sheets of different thicknesses against an apertured wall of a vacuum platen, assuming that the glass sheet engages half the perforations of the apertured wall while the other half of the perforations surround the perforations that engage the glass sheet. Table II also indicates the maximum amount of vacuum in terms of height of water column that overcomes the need to support float glass sheets of different thicknesses against the apertured plate and also provides enough force to lift the glass sheet into engagement against the soft, fluffy, porous, fiber glass fabric cover without compressing the cover to such an extent that the cover loses its soft, fluffy and porous properties.

TABLE II

| Glass Thickness | Water Column Required to Hold Glass | Maximum Water Column to Lift Glass Without Undue Cloth Marks |
| --- | --- | --- |
| ¼ inch (6.35mm) | 6.2 inches (155mm) | 9.0 inches (229mm) |
| 3/16 inch (4.76mm) | 4.7 inches (120mm) | 7.5 inches (172mm) |
| 5/32 inch (3.97mm) | 4.0 inches (102mm) | 6.0 inches (152mm) |
| ⅛ inch (3.18mm) | 3.1 inches (78mm) | 4.5 inches (115mm) |

With the glass sheet or sheets drawn against its underside by vacuum, the platen 40 is raised to the elevated position as shown in FIG. 1 so as to leave sufficient clearance to insert an outline shaping mold 60 between the hearth block 25 and the platen. The shaping mold conforms to the outline and contour desired for the bent glass sheets and is preferably constructed in accordance with the disclosure of U.S. Pat. No. 3,973,943 to S. L. Seymour, the disclosure of which is hereby incorporated by reference. The shaping mold is preferably of the outline ring type, light in weight and notched along its upper edge in order to provide minimal interference with the flow of air during tempering.

The shaping mold is carried on a shuttle 61 by which the shaping mold is translated horizontally through the bending, tempering and unloading zones. In the specific embodiment illustrated, the shuttle consists of a pair of cantilevered beams 62 supported at one end by vertical braces 63, the upper ends of which are adapted to slide along a pair of horizontal guide rods 64. The means for driving the shuttle 61 along the horizontal path may be provided by way of an electric motor (not shown) driving a continuous chain 65 to which the upper ends of braces 63 are affixed. Cross-braces 66 may support the shaping mold or molds on the shuttle.

When the vacuum platen 40 engaging a glass sheet has been raised to a height above the elevation of the shaping mold 60, the shuttle is driven to the left as viewed in FIG. 1 so as to bring the bending mold into direct alignment beneath the sheet of glass elevated on the vacuum platen. Typically, the distance between the vacuum platen and the hearth block 25 at this point may be about 6 to 8 inches (15 to 20 centimeters). This distance will have an effect on the rate at which the glass sheet loses heat, since a higher elevation raises the glass sheet into a cooler environment. This effect may be used to "fine tune" the temperature (and thus the viscosity) at the moment the glass sheet is dropped onto the shaping mold.

The uppermost extent of the shaping mold when in position directly beneath the glass sheet is spaced from the glass sheet a distance greater than the minimum required to clear the glass sheet, so that when the glass sheet is released from the vacuum platen it will fall a distance onto the shaping mold sufficient to generate a substantial bending force on the glass upon impact. In the typical case where the contour of the shaping mold includes points of maximum elevation, the falling glass sheet first contacts these high points, and a bending moment about these points is generated which forces the remainder of the glass sheet to bend downwardly until substantially complete contact is made with the shaping mold. A suitable distance between the vacuum platen and the high points of the shaping mold has been found to be about 1 to 2 inches (2.5 to 5 centimeters), and about 2 to 6 inches (5 to 15 centimeters) at the low points of the mold. The precise distance through which the glass falls will depend upon the weight and temperature of the glass, the degree of curvature to be imparted to the glass, and the geometry of the particular shape, and in unusual cases may vary beyond the distance ranges given previously.

Release of the glass sheet from the vacuum platen is carried out by reducing the vacuum to an amount insufficient to support the glass sheet. This may be accomplished conveniently by opening a valve to bring the interior of the vacuum platen into communication with atmospheric pressure. Or in some cases, it may be desirable to expedite the release of the glass from the platen by following a rapid decay of the vacuum with a rapid buildup to a positive pressure.

Another optional feature is to provide the vacuum platen with a plurality of separately controllable vacuum zones so that the vacuum may be released nonuniformly. For example, it may be beneficial in some cases to release the edge portions and the center portion of a glass sheet at different times. By delaying the release of the center portions a slight reverse bend may be imparted to the glass, which may be helpful in avoiding excessive center sag when the glass sheet is dropped onto a concavely contoured outline shaping mold. Conversely, differential vacuum release may be utilized to accentuate a relatively deep bend which may be otherwise difficult to attain by impact force alone.

The momentum imparted to the glass sheet by its free fall onto the shaping mold preferably provides essentially the sole bending force for conforming the glass sheet to the contour of the shaping mold. Although some minor amount of sagging due to the force of gravity may take place after the glass sheet has come to rest on the shaping mold, its magnitude is insignificant relative to the bending produced by the momentum-generated force in the preferred mode of operation. Sagging is a relatively slow process, and in the present invention, tempering is preferably initiated in the minimum amount of time, thereby providing insufficient time for a significant amount of gravity-induced sagging to take place.

On the other hand, for some difficult bends it may be desirable to delay the start of tempering so as to permit a significant amount of additional sagging to take place after the glass sheet has dropped onto the mold. Although slower than the preferred mode, such a technique would be considerably faster than gravity sagging along since the initial dropping of the glass onto the mold would accomplish a substantial part of the bending very quickly.

Upon receiving the glass sheet, the shaping mold is immediately transferred out of the bending staion into the tempering station 12. The tempering station includes upper and lower blast heads 70 and 71 which direct blasts of tempering medium (usually air) onto opposite sides of the glass sheet so as to rapidly cool surface portions of each glass sheet, thereby imparting a temper to the glass sheet.

In the type of tempering station shown in FIG. 1, each blast head includes a plurality of pipe modules 72 in fluid communication at their ends with a manifold 73 or 74. Each manifold, in turn, is supplied with pressurized tempering fluid through ducts 75 and 76. Each of the pipe modules 72 has a plurality of small orifices oriented so as to direct jets of tempering fluid toward the position occupied by glass sheets conveyed into the space between the upper and lower blast heads 70 and 71. The pipe modules 72 may be provided with adjustability in the vertical direction with respect to the manifolds 73 and 74 so that more uniform spacing between the glass surfaces and the pipe modules may be provided. The lower blast head 71 may be provided with a hinged support 80 at one end and piston means 81 at the opposite end so as to permit the lower quench module to be tilted when the need arises to clear the glass fragments from the blast head.

While blasts of tempering medium are being directed onto the glass sheets in the tempering station, it is preferred to provide relative motion between the blast heads and the glass sheets. This may be carried out by horizontally reciprocating the shuttle means 61 on which the shaping mold and glass sheets are carried.

When tempering has been completed, the shuttle means 61 advances to the full right-hand position as shown in FIG. 1 to bring the glass sheet or sheets into the unloading station 13. There, the glass sheets may be removed from the shaping mold by hand or by suitable mechanical means.

Figure 4:
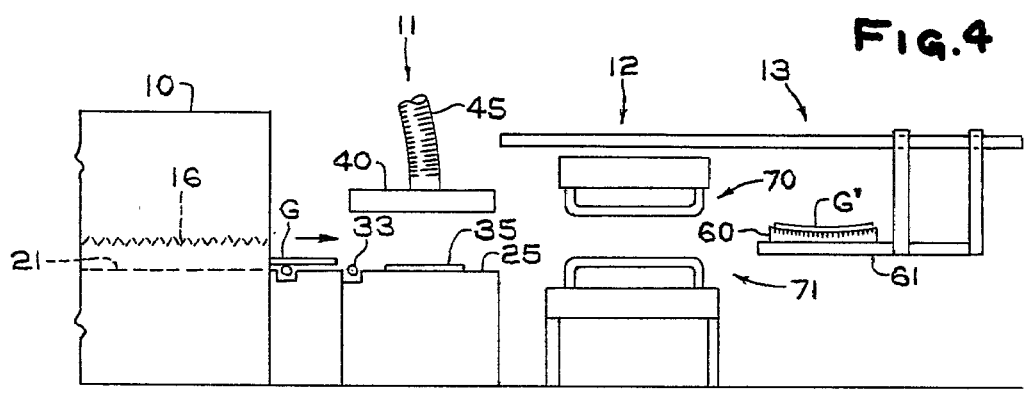

FIGS. 4 through 8 illustrate one cycle of operation in the method of bending glass sheets in accordance with the present invention. In FIG. 4, a sheet of glass G is emerging from the furnace 10. At the same time, an already bent and tempered sheet of glass G' is about to be unloaded from the shuttle 61. The glass sheet G has been heated to an elevated temperature that is closely controlled by virtue of uniform heat provided by the gas supplied through the hearth block 21 supplemented by adjustable heat intensity supplied through the closely regulated overhead electrical heaters 16.

In FIG. 5, the sheet of glass G has entered the bending station 11 and its front end has engaged the locator frame 35 while being driven at its trailing edge by downstream roll 33. At the same time, vacuum platen 40 is being lowered to have its soft, fluffy, porous cover 43 engage the glass sheet. The previous glass sheet has been unloaded from the shuttle 61 and the shuttle has begun to move toward the bending station.

Figure 6:
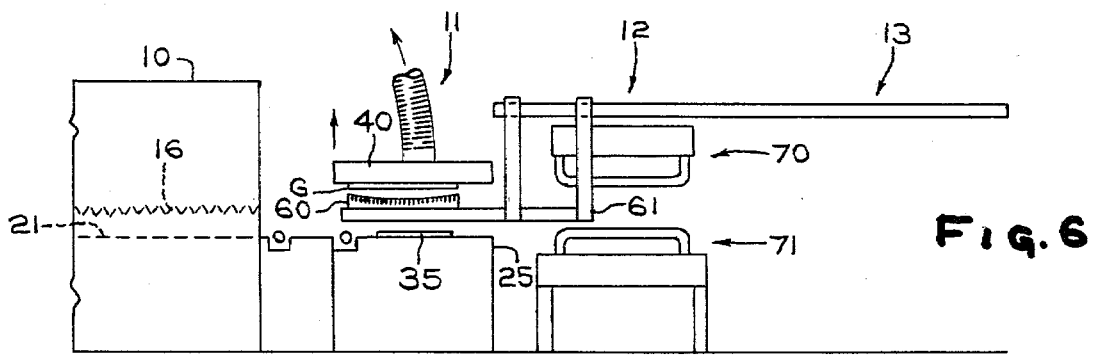
Figure 7:
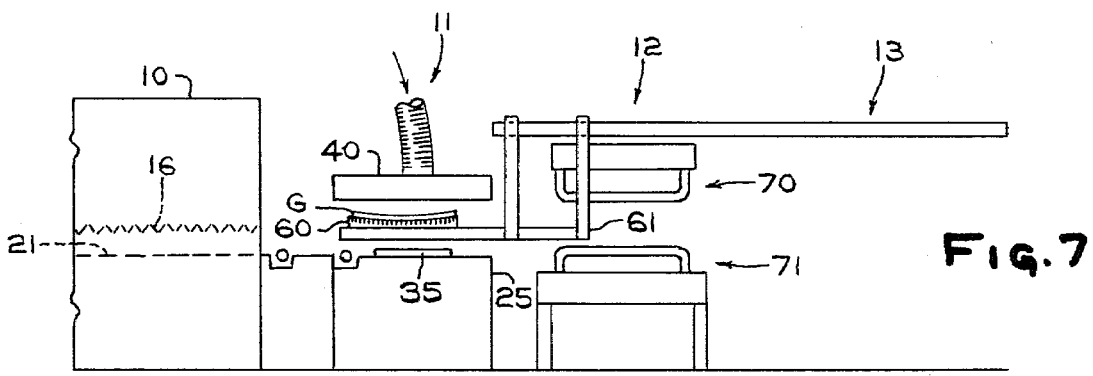

In FIG. 6, the sheet of glass has been lifted from the gas support bed 25 into engagement with the cover 43 by the vacuum platen 40 and shuttle 61 has come to rest, with the shaping mold 60 directly beneath the glass sheet. In FIG. 7, the vacuum has been released from the vacuum platen and the sheet of glass has fallen onto the shaping mold 60 and has thereby become bent to the desired curvature.

Figure 8:
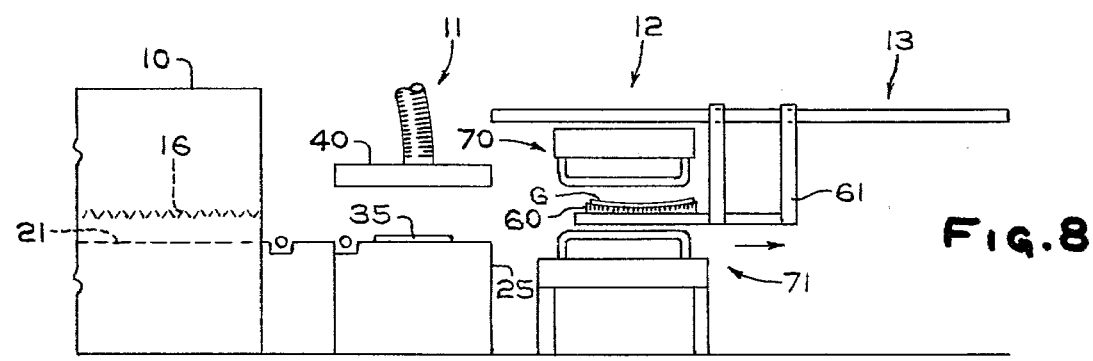

The shuttle immediately carries the glass sheet out of the bending station and into the tempering station 12 where it is rapidly cooled by blasts of air as shown in FIG. 8. Thereafter, the shuttle carries the glass sheet into the unloading station 13, and the cycle of steps starting with the step depicted in FIG. 4 is repeated.

While the specific embodiment of the invention involves a glass sheet holder in the form of a vacuum platen, it is also envisioned that the glass sheet may be lifted and supported against a glass sheet holder at the bending station by applying hot pressurized gas or other fluid in an upward direction against the lower surface of the glass sheet and to maintain said upward flow until such time as the bending mold 60 is in its bending position beneath the glass sheet holder 40. At this time, the upward flow of pressurized gas is stopped and the glass sheet is free to drop onto the bending mold for drop forming thereagainst and for transportation thereon to the cooling station. The presence of a soft, fluffy, porous cover comprising a plurality of layers of fiber glass cloth interposed between the bottom surface of a highly polished metal plate of a glass sheet holder and the upper surface of the glass prevents the upper surface of the glass sheet from replicating any imperfections in the bottom plate of the glass sheet holder regardless of whether the plate is apertured with perforations or continuous.

The following operating parameters are an example of a successful operation of the above-described preferred embodiment of the invention with glass sheets 3 millimeters thick. Under different conditions the data will vary. The furnace atmosphere was maintained at a temperature of about 1300° F. (700° C.). The electric heaters 16 were energized to provide an upper surface temperature of the glass ranging between 10° F. (6° C.) to 50° F. (28° C.) below the bottom glass surface temperature. The gas issuing from the hearth block 25 in the bending zone may be about 1100° to 1350° F. (600° C. to 725° C.), typically about 1250° F. (675° C.) The vacuum platen 40 attained a temperature of about 500° to 750° F. (260° to 400° C.) after a period of operation due to its proximity to the hot gases from hearth block 25. The glass was typically at about 1210° F. (650° C.) on its upper surface and 1250° F. (675° C.) on its bottom surface when picked up by the vacuum platen. A total of about 6 seconds elapsed from the time of glass pick-up until the initiation of tempering, at which time the glass had cooled to an overall temperature of approximately 1190° F. (640° C.). About 3 seconds elapsed from the time the glass was dropped onto the shaping mold until tempering was initiated. Altogether about 10 seconds was required for the glass to pass from the furnace exit, undergo bending, and enter the tempering station. These rapid bending rates not only indicate a high rate of throughput, but are also advantageous for the sake of attaining high degrees of temper since the rapidity of the bending process permits tempering to begin before the glass sheets have lost an appreciable amount of heat.

Descriptions of specific embodiments have been set forth herein for the sake of illustrating the best mode and other illustrative examples for practicing applicant's invention, but it should be understood that other variations and modifications as are known to those of skill in the art may be employed to provide fainter replications of surface imperfections than the prior art without departing from the spirit and scope of the invention as set forth in the claims which follow.

I claim:

1. An apparatus for shaping glass sheets comprising:
    furnace means for heating glass sheets to a softened condition;
    support means adjacent to said furnace means for supporting glass sheets;
    conveyor means for transferring glass sheets from said furnace means to said support means;
    a platen having a perforated plate and having an enclosed interior space in communication with a source of vacuum;
    a soft, fluffy, porous, fiber glass fabric cloth;
    means for maintaining said cloth against said perforated plate to mask imperfections thereon;
    means for transferring said platen into and out of close proximity to said support means so as to lift a glass sheet from said support means by means of vacuum;
    a shaping mold having outwardly facing shaping surfaces defining the desired curvature and corresponding to the shape of the glass sheets; and
    shuttle means for alternately bringing said platen and said shaping mold into and out of superimposed vertically spaced relationship to each other, wherein said shaping mold in the superimposed position is supported at an elevation below said platen so as to receive and shape a glass sheet dropped from said platen.

2. The apparatus as set forth in claim 1 wherein said cloth includes a plurality of layers of knit fiber glass cloth.

3. The apparatus as set forth in claim 1 wherein said cloth includes a plurality of layers of textured yarn.

4. The apparatus as set forth in claim 1, 2 or 3 wherein said furnace means includes:
    means for providing a hot gas support to support and heat a glass sheet; and
    overhead electrical heating means to control the temperature of a glass sheet to be heated.

5. The apparatus as set forth in claim 1 wherein said transferring means includes:
    means for vertically moving said platen into and out of close proximity to said support means.

6. The apparatus as set forth in claim 1 further including:
    fluid means for biasing a glass sheet toward said platen.

7. A method of shaping glass sheets, comprising the steps of:
    heating a glass sheet within furnace means to approximately its softening point and bringing the glass sheet to rest on support means adjacent to the furnace means;
    translating a vacuum platen having a substantially flat, perforated surface and a soft, fluffy, porous, fiber glass fabric cloth over the perforated surface to mask imperfections thereon, toward the support means to bring the flat, perforated surface into close proximity to, and parallel with, a surface of the glass sheet;
    drawing vacuum through the flat, perforated surface and cloth so as to retain the glass sheet on the platen against the cloth;
    translating the platen away from the support means to lift the glass sheet from the support means and to bring the glass sheet into a generally horizontal orientation on the underside of the platen;
    bringing into vertical alignment with and beneath the glass sheet held on the platen a shaping mold having a contour defining the desired contour for the glass sheet; and
    releasing the glass sheet from the platen so as to fall onto the shaping mold and conform to the contour defined by the shaping mold.

8. The method as set forth in claim 7 wherein the sheet is substantially horizontal and said translating step includes:
    upwardly directing gas toward the sheet to bias the sheet toward the vacuum platen.

9. The method as set forth in claim 7 or 8 wherein the sheet is substantially horizontal and said heating step heats the lower sheet surface to a temperature between about 10° F. (6° C.) and 50° F. (28° C.) hotter than the upper sheet surface during the practice of said drawing step.

10. The method as set forth in claim 9 further including the step of:
    cooling the sheet at a rate sufficient to impart at least a partial temper thereto.

* * * * *